2,899,261

OXIDATION-INGRAIN COLOR EMULSIONS

Albert Voorhees, Somerville, and Edward F. Scott, New Brunswick, N.J., assignors to American Cyanamid Company, New York, N.Y., a corporation of Maine No Drawing. Application May 28, 1957
Serial No. 661,994

16 Claims. (Cl. 8—62)

This invention relates to a composition for printing or dyeing with oxidation-ingrain colors. More particularly, the invention relates to a composition of suitable viscosity for printing with ingrain colors.

The principal oxidation-ingrain colors are aniline black which is developed on the fiber by printing or dyeing an aniline salt, usually aniline hydrochloride, and then oxidizing it to an insoluble compound which is generally considered to be an azine derivative; diphenyl black which is obtained by oxidizing para-amino diphenylamine on the fiber; and para brown which is produced by oxidizing a phenylene diamine with a nitrite. In the case of this last dye the oxidation product obtained is chemically different from the other two and is a polyazo compound. Sometimes in order to enhance the intensity of the aniline black some paraphenylene diamine is added to the aniline salt. All of the dyes are produced on the fiber itself and hence are referred to as ingrain colors.

When ingrain colors, or rather the raw material from which they are produced by oxidation, are printed, it has been customary to use a carbohydrate printing paste containing the aniline salt, an oxidizing agent and one or more oxygen carriers containing salts of metals capable of existing in at least two states of oxidation. After printing, the cloth is dried and heated with air or steam. In the case of aniline black the first product produced is a dark green which is sometimes referred to as Emeraldine. This is then further oxidized with bichromate to the final aniline black. In the case of aniline black and diphenyl black, the paste is strongly acid and with the usual starches and other carbohydrates used the paste rapidly thins out, and it has been necessary to make up the final pastes only shortly before their application to the goods. Other disadvantages are that the carbohydrate printing pastes tend to body the fabric which then has to be subjected to excessive washing to remove them. Also the penetration is poor in some fabrics, such as for example cellulose acetate.

According to the present invention it has been found that if for the carbohydrate there is substituted an oil-in-water emulsion as a printing paste bodied with a relatively small amount of certain particular carbohydrates only, namely galactans such as gum tragacanth, and particularly mannogalactans such as the various guar gums, or with polyacrylamides, all of the difficulties encountered with the straight carbohydrate printing paste are avoided, stable pastes are obtained, and good prints can be made on cellulose acetate fabric.

The use of oil-in-water emulsions in certain printing processes is not new. Thus, for example, in U.S. Patent 2,597,281 there is described vat dye printing. However, the conditions of printing ingrain colors are entirely different. First, instead of a strongly alkaline paste, as with vat dyes, the paste is usually acid and, secondly, with vat dyes printing can be effected either with carbohydrate pastes or with oil-in-water emulsions. In the present case neither is satisfactory, and it is necessary that there be present both an oil-in-water emulsion and a particular kind of carbohydrate, galactan, or a polyacrylamide. It is not known why the behavior of the printing pastes is so entirely different with ingrain colors and no theory of action is advanced.

The oil-in-water emulsion is prepared with a lignin sulfonate exactly as in the case of the earlier patent referred to. The particular lignin sulfonate is not critical, but sodium lignin sulfonate is preferred. Of the galactans or polyacrylamide thickeners, the mannogalactans and polyacrylamide are preferred, although satisfactory consistencies are obtained with gum tragacanth.

It is an advantage of the present invention that the other constituents used in the ingrain color development, such as the oxidizing agents and oxygen carriers for aniline black, are not changed by the present invention. In other words, the conventional formulations are used, the only difference being that the conventional carbohydrate printing paste is replaced by an oil-in-water emulsion bodied with the galactans or polyacrylamide.

The particular sequence in which the emulsion is formed is not critical. All of the ingredients may be emulsified in a single operation or two emulsions may be prepared and then mixed. Another method is to prepare a clear emulsion which keeps well and to which the constituents for forming the ingrain color are added. While these various methods give satisfactory results, it is preferred to prepare an emulsion containing all of the ingredients except the aniline salt in the case of aniline black and then adding the aniline salt to the emulsion.

In preparing emulsions it is sometimes desirable to avoid foaming by the addition of an anti-foaming agent such as octyl alcohol. This is not necessary if the equipment is not used at a high capacity and is not an essential factor.

The invention will be described in greater detail in conjunction with the following specific examples in which the parts are by weight unless otherwise specified.

*Example 1*

20 parts of sodium lignin sulfonate, 1 part of high viscosity carboxymethyl cellulose and 3 parts of a mannogalactan (guar gum) are mixed together and the mixture slowly added to 300 parts of water in an emulsifier operated at medium speeds. After all of the solids are thoroughly dissolved, 676 parts of a petroleum hydrocarbon oil having approximately 15% aromatics, 5% olefins, and 80% saturated hydrocarbons, sold under the trade name Varsol No. 1, which name will be used for brevity in the succeeding examples, is added. The emulsifier is speeded up to high speed and mixture continued after all of the Varsol has been added until a stable oil-in-water emulsion has been obtained.

The emulsion is then divided into two portions, one of 27 parts and the other of 25 parts, and to the first portion there is added 2 parts of glacial acetic acid and then 9 parts of aniline hydrochloride in 12 parts of water. Mixing is with gentle agitation. To the other 25 parts of emulsion there is added a solution of 3 parts of sodium chlorate and 6 parts of sodium ferrocyanide in 16 parts of water at 180° F. The mixture is then stirred and cooled to room temperature.

The two emulsions just described are then mixed together to give a final colored emulsion which is printed on cotton cloth, dried, aged in a steam ager at 217° F. and then oxidized at 130° F. with .25% bichromate and .50% acetic acid. After oxidation, the cloth is rinsed, soaped at the boil, again rinsed and dried. An excellent green shade of black results having a high degree of softness.

Another portion of the mixed emulsion was permitted to stand overnight. It did not break but, of course, there was some oxidation of the aniline hydrochloride, which is to be expected as the emulsion contained the oxidizers.

Example 2

The procedure of Example 1 was followed, but diethyleneglycol replaced the acetic acid in the formation of the emulsions. The prints showed the same good quality and the same softness of hand.

Example 3

The procedure of Example 1 was repeated replacing the 2 parts of acetic acid with 4 parts of urea and reducing the amount of water from 12 parts to 10. The print obtained was slightly redder but was a good quality black.

Example 4

The procedure of Example 1 was repeated but the mannogalactan was replaced with an equal amount of gum tragacanth. An excellent full green shade of black was obtained.

Example 5

An emulsion clear was prepared by the procedure of Example 1 using 531 parts of water, 20 parts of sodium lignin sulfonate, 12 parts of a starch ether, 12 parts of sodium alginate and 425 parts of Varsol.

To 27 parts of the above emulsion clear were added 9 parts of aniline hydrochloride and 2 parts of diethylene glycol dissolved in 12 parts of water. To another 25 parts of the emulsion there were added 3 parts of sodium chlorate and 6 parts of sodium ferrocyanide dissolved in 16 parts of water.

The two emulsions were then mixed together as described in Example 1 and printed on to cotton goods. An excellent blue shade of black was obtained.

Example 6

An emulsion was prepared by mixing in an emulsifier in order the following constituents:

298 parts of water
3 parts octyl alcohol
4 parts mannogalactan powder
10 parts sodium lignin sulfonate
100 parts aniline hydrochloride
20 parts diethylene glycol
65 parts Varsol The emulsion was started at low speed until the Varsol was added, at which time the speed was increased and mixing continued until a smooth emulsion was obtained.

A second emulsion was prepared as follows: 30 parts of sodium chlorate and 60 parts of sodium ferrocyanide were dissolved in 94 parts of water. A second solution was prepared with 1 part of octyl alcohol, 4 parts of mannogalactan powder, 10 parts of sodium lignin sulfonate and 199 parts of water. To this solution the solution of chlorate and ferrocyanide was added and the whole emulsified in a high-speed mixer with 102 parts Varsol until a smooth emulsion was obtained.

Equal parts of the two emulsions were then stirred together and printed on cotton and on spun rayon. Each print was dried and then aged in a steam ager at 217° F., the cotton print being aged for 5 minutes and the rayon for 10. Thereupon, the prints were oxidized as described in Example 1, rinsed, soaped, again rinsed and dried. A good black shade was obtained.

Example 7

An emulsion was prepared by dissolving in 620 parts of hot water 4 parts of octyl alcohol, 33 parts of sodium chlorate and 67 parts of sodium ferrocyanide. 8 parts of mannogalactan powder and 20 parts of powdered sodium lignin sulfonate were then added and the whole emulsified with 248 parts of Varsol. The mixing was at medium speed until the Varsol was added, during which time the speed was increased to high speed.

10 parts of the dry aniline hydrochloride were then stirred into 90 parts of the above emulsion. The aniline salt dissolves rapidly and the emulsion does not break. The resulting emulsion was then printed on cotton and rayon and aged and finished as described in the preceding example. An excellent blue-black shade was obtained.

Example 8

An emulsion was prepared from the following ingredients:

607.5 parts water at 145° F.
37.5 parts sodium chlorate
75 parts sodium ferrocyanide
2 parts octyl alcohol
10 parts mannogalactan powder
20 parts sodium lignin sulfonate
248 parts Varsol To 80 parts of the above emulsion there were added 20 parts of a 50% solution of aniline hydrochloride in water. The composition was then printed and finished as in Example 7. The same excellent blue-black shade was obtained.

Example 9

The following modified emulsions of Example 8 were prepared:

A. 76 parts of emulsion, 20 parts of 50% aniline hydrochloride solution, 4 parts urea.
B. 75 parts of the emulsion, 20 parts of 50% aniline hydrochloride solution, 5 parts of glycerine.
C. 75 parts of emulsion, 20 parts of 50% aniline hydrochloride solution, 5 parts diethylene glycol.
D. 79 parts of emulsion, 20 parts aniline hydrochloride 50% solution, 1 part para-phenylene diamine.
E. 80 parts of emulsion and a solution of 10 parts aniline hydrochloride, 0.25 part para-phenylene diamine, 1 part glacial acetic acid in 8.75 parts water was prepared and added to the emulsion.

The above compositions were printed on cotton and rayon as described in Example 7. The glycerine, urea, and diethylene glycol emulsions were slightly weaker than Example 8 but commercially satisfactory. In each case the formulations with para-phenylene diamine gave superior jet black prints. Formulation D gave the best results. Formulation E, although containing only one-quarter as much para-phenylene diamine, gave substantially the same results as D.

Example 10

An emulsion was prepared from the following ingredients:

322.5 parts water at 145° F.
39.3 parts sodium chlorate
78.6 parts sodium ferrocyanide
2.1 parts octyl alcohol
300 parts 20% solution of polyacrylamide having a viscosity of 77,000 cps.
21 parts sodium lignin sulfonate powder
258 parts Varsol To 80 parts of the above emulsion there was added 20 parts of a 50% aqueous aniline hydrochloride solution. The resulting composition was printed on cotton and rayon and finished as described in the preceding example. Excellent prints were obtained. The following advantages were noted.

(1) The oxidation of the aniline was slowed down appreciably which increases the keeping power of the emulsion.
(2) The initial fluidity of the emulsion did not change after standing for a long period of time.
(3) The steel doctor blade on the printing roll was not etched by the aniline hydrochloride.

Example 11

500 parts of 2% aqueous mannogalactan solution, 31 parts of sodium chlorate, 50 parts of aluminum chloride solution (52° Twaddell) and 60 parts of water were stirred at moderate speed until solution was complete. Thereupon, 12 parts of a 1% ammonium vanadate solution and 20 parts of sodium lignin sulfonate powder was added. After these constituents dissolved, mixing speed was increased and an emulsion was prepared with 327 parts of Varsol.

A solution was prepared by dissolving 4 parts of para-amino diphenylamine, 4 parts ethylene glycol monoethyl ether in 8 parts of 56% acetic acid and 4 parts of 80% lactic acid. The solution was then stirred into the emulsion prepared above and the composition printed on cotton, on spun rayon and on spun cellulose acetate and cellulose acetate satin. The prints were dried, aged for 10 minutes in a steam ager at 217° F., rinsed, soaped for 5 minutes at 45° F. with .1% soap solution, rinsed and dried. Good black shades were obtained in every case, including the prints on cellulose acetate.

Example 12

An emulsion was prepared from the following ingredients:

| | Parts |
|---|---|
| Carboxymethyl cellulose (6% solution) | 200 |
| Water | 200 |
| Sodium formaldehyde sulfoxylate | 2.5 |
| Sodium chlorate | 31.25 |
| Ammonium nitrate | 37.50 |
| Sodium lignin sulfonate | 20.0 |
| Ammonium metavanadate (1% solution) | 2.5 |
| Varsol | 506.25 |

To 90 parts of the above emulsion, there was added 2.5 parts of paraphenylene diamine and 0.20 part sodium formaldehyde sulfoxylate dissolved in a mixture of 3.3 parts of hot water and 4.0 parts of glacial acetic acid.

The resulting composition was printed on cotton, spun rayon, and cellulose acetate. The prints were dried, steamed 5 minutes at 217° F., rinsed in warm water, soaped, rinsed, and dried.

An excellent deep red-brown shade was obtained.

Example 13

An emulsion of the following composition was prepared:

| | Parts |
|---|---|
| 2% mannogalactan solution | 200 |
| Water | 200 |
| Sodium chlorate | 31.25 |
| Ammonium nitrate | 37.50 |
| Sodium Lignin sulfonate | 20.0 |
| 1% ammonium metavanadate solution | 2.5 |
| Varsol | 506.25 |
| Sodium formaldehyde sulfoxylate | 2.5 |

To 90 parts of the above emulsion there was added 2.5 parts of paraphenylene diamine and 0.20 part of sodium formaldehyde sulfoxylate dissolved in a mixture of 3.3 parts of hot water and 4.0 parts of glacial acetic acid.

The resulting composition was printed on cotton, spun rayon, and cellulose acetate. The prints were dried, steamed 5 minutes at 217° F., rinsed in warm water soaped, rinsed, and dried.

A deep red shade of brown was obtained.

We claim:

1. A stable printing composition comprising an oil-in-water emulsion having a non-alkaline pH containing an aniline salt, alkali metal chlorate, a water-soluble salt of a metal capable of existing in two valences acting as an oxygen carrier, a water-soluble lignin sulfonate and a bodying material selected from the group of galactans and polyacrylamide.

2. A composition according to claim 1 in which the bodying agent is a mannogalactan.

3. A composition according to claim 1 in which the bodying agent is polyacrylamide.

4. A composition according to claim 1 in which the water-soluble oxygen carrier is sodium ferrocyanide.

5. A composition according to claim 4 in which the bodying agent is a mannogalactan.

6. A composition according to claim 4 in which the bodying agent is polyacrylamide.

7. A stable printing composition comprising an oil-in-water emulsion containing an oxidizing agent, para-amino diphenylamine, and a bodying agent selected from the group consisting of galactans and polyacrylamide.

8. A composition according to claim 7 in which the bodying agent is a mannogalactan.

9. A composition according to claim 7 in which the bodying agent is polyacrylamide.

10. A stable printing composition comprising an oil-in-water emulsion having a reducing agent, an oxidizing agent, paraphenylene diamine, an agent generating acid under the action of steam, a water-soluble lignin sulfonate and a bodying material selected from the group of galactans and polyacrylamide.

11. A composition according to claim 10 in which the bodying agent is mannogalactan.

12. A composition according to claim 10 in which the bodying agent is polyacrylamide.

13. A method of printing which comprises printing a design with a printing composition of claim 1 on a cellulosic fabric, ageing at elevated temperature and washing out remaining water-soluble components of the printing composition.

14. A method of printing which comprises printing a design with a printing composition of claim 2 on a cellulosic fabric, ageing at elevated temperature and washing out remaining water-soluble components of the printing composition.

15. A method of printing which comprises printing a design with a printing composition of claim 3 on a cellulosic fabric, ageing at elevated temperature and washing out remaining water-soluble components of the printing composition.

16. A method of printing which comprises printing a design with a printing composition of claim 10 on a cellulosic fabric, ageing at elevated temperature and washing out remaining water-soluble components of the printing composition.

References Cited in the file of this patent

UNITED STATES PATENTS

| 1,071,274 | Stiegler | Aug. 26, 1913 |
| 2,951,571 | Fischer | Mar. 20, 1934 |

OTHER REFERENCES

Am. Dyestuff Reporter, vol. 40, No. 12, June 11, 1951, pp. 369–371 (esp. p. 371).

Schildknecht: Vinyl and Related Polymers, 1952, John Wiley and Sons, N.Y., p. 316.